UNITED STATES PATENT OFFICE 2,655,225

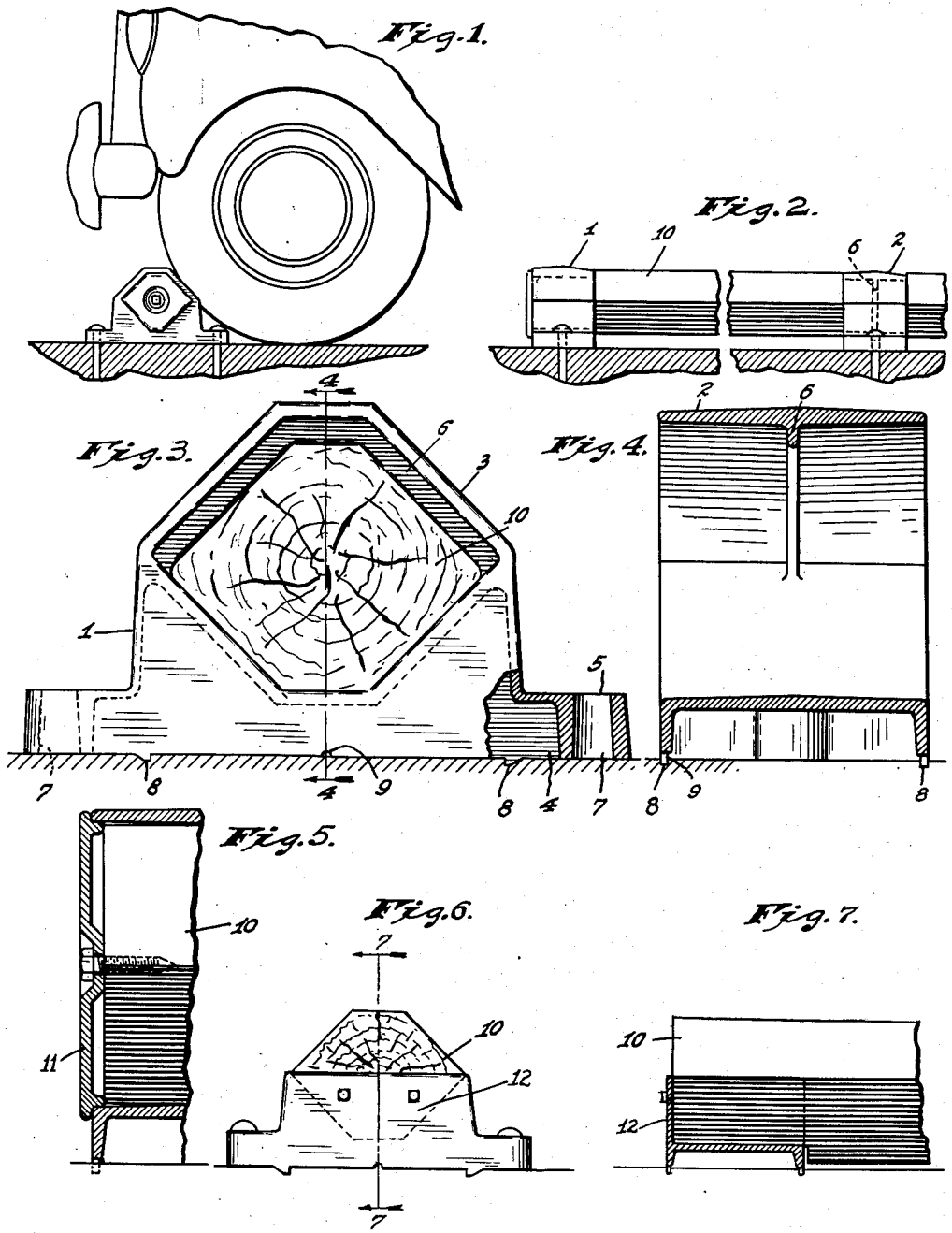

VEHICLE BARRIER

Marcus Russel Harris, Indianapolis, Ind.

Application August 4, 1949, Serial No. 108,540

1 Claim. (Cl. 188—32)

The present invention relates to improvements of automobile barriers adapted to provide stopping means to prevent the forward movement of automobiles when being driven into parking lots, garages and the like.

It is one of the objects of my invention to provide a barrier which is so constructed that its overall height is such that it will not be struck by the bumper or the mud guard of the automobile, but is so spaced from the floor that it will provide stopping means to prevent the forward movement of an automobile or a wheeled vehicle.

Another object of the invention is to provide a barrier having the above characteristics which when struck by vehicle wheels will tend to be driven downwardly toward the base on which it is resting rather than forwardly by the impact of the vehicle wheels.

Another object of the invention is to provide a barrier having the above characteristics in which the blocking member may be supported above the ground or floor thereby permitting drainage in wet weather and providing space between the floor or ground to permit cleaning therebeneath.

Other objects of the invention will appear more fully in the appended specification and claim.

Referring to the drawings illustrating embodiments of my invention—

Fig. 1 is a view showing my barrier in position relative to an automobile wheel;

Fig. 2 is a side elevation of my barrier construction;

Fig. 3 is an end view thereof;

Fig. 4 is a sectional view taken on the line 4—4 of Fig. 3;

Fig. 5 is a detail section of one of the end sockets of my invention;

Fig. 6 is an end view of a modified form of my invention, and

Fig. 7 is a partial side elevation thereof.

In the embodiments illustrated, having particular reference to Figs. 1 to 5 inclusive, a plurality of saddles 1 and 2 is provided. Each of the saddles preferably consists of a casting having a rectangular socket 3 supported on the base 4. The base has laterally disposed ears 5. Intermediate of the ends of the sockets 3 I provide an internally extending spacing rib 6.

Each of the ears 5 is provided with an opening 7 through which anchoring pins may be driven into the ground or base to which the saddle may be secured and the bottom surface of the base is provided with lugs 8 which may bite into the surface to assist in maintaining the saddle in position.

For the purpose of aligning the saddles I provide an aligning groove 9 on the bottom of the base so that in positioning the plurality of saddles a line may be drawn along the ground or floor and by placing the aligning groove on this line the saddle will be properly aligned.

The rectangular sockets are adapted to receive the ends of a barrier rail 10 which is preferably rectangular with the top and bottom edges planed or flattened off.

In erecting the barrier, two or more of the saddles may be used. The saddles are placed in position on the base on which they are supported, preferably without fastening the same into position. The barrier rails 10 then have their ends inserted in the sockets, being held in spaced relation by means of the internal ribs and after the suitable length of the barrier has been erected, the saddles may be secured in position by driving pins or spikes through the openings 7 in the ears 5.

The end saddle, where a plurality of rails is adapted to be used, may have the spacing rib 6 left out of the socket so that the end of the barrier rail may extend to the end of the socket. The end of the socket may be closed by means of a cover plate and the cover plate be held in position by screws which are driven into the rail or rails.

It is preferable to so construct the saddles that the top of the barrier rail will be approximately 7½″ above the floor or base to which the barrier is secured. This positions the barrier rail at such a height that an automobile bumper and the fenders of an automobile will clear the same permitting the wheels to come in contact with the barrier rail. It is to be noted that due to the shape of the barrier rail a surface of approach of the vehicle wheel is presented to the vehicle wheel so that the wheel will hit the surface at an angle of approximately 45°. With the comparatively low height of the barrier rail this surface of approach is such that the wheel or wheels of the vehicle will tend to drive the rail and the saddles downwardly toward the floor or roadway to a greater extent than it will tend to move the same laterally.

As a result I have found from experience that where the barrier is used on such surfaces as concrete surfaces and the like, it is only necessary to cement the base to the floor and it is unnecessary to drive the spikes through the floor to prevent displacement.

However, where the barriers are adapted for use in open parking lots and such places it is desirable to drive the spikes through the saddles into the ground to prevent theft thereof.

In actual operation, where my barrier is used for parking lots, in large garages and the like, I preferably space the saddles approximately eight (8) feet apart, which provides an indication of parking space for the vehicles to be placed in position.

Further by trimming off the top edge of the barrier rail and likewise by flattening the top edge of the saddles, in the event, if it is necessary, a vehicle may be driven over the barrier in an emergency.

In the structure illustrated in Figs. 6 and 7 I have shown a slight modification of my invention which is lighter in construction and is particularly adapted for use in private garages and the like. In this structure the socket in the saddles are triangular in shape with the apex of the triangle flattened and the outer end of the socket is closed by a wall 12 which may be in the form of a rib, like that illustrated in Fig. 6, or a complete closure like that at 12. In the use of such a structure in private garages, only two saddles are used and the rail may be dropped in the sockets and if desired spiked in position.

It is to be noted, however, that in all of the structures the barrier is supported above the floor or ground so that there will be complete drainage beneath so that rotting is prevented if the rail is constructed of wood and rusting prevented if the rail is constructed of metal. Furthermore by maintaining the rail elevated and with the inclined walls thereof, provision is made for cleaning beneath the rail.

I claim as my invention:

In a vehicle barrier, a support comprising an integral base having a flat bottom surface for ground engagement and provided with laterally extending ears having anchor receiving openings extending therethrough, a barrier receiving socket extending upwardly therefrom comprising supporting walls diverging outwardly from points on opposite sides of the approximate center point of said base, a one piece wheel engaging barrier rail having sides diverging outwardly from points on opposite sides of the approximate longitudinal center of the rail to engage and rest upon the said supporting walls, and means extending laterally through said base to engage the end of said rail to secure the same in said base.

MARCUS RUSSEL HARRIS.

References Cited in the file of this patent

UNITED STATES PATENTS

| Number | Name | Date |
|---|---|---|
| 1,826,277 | Ericson | Oct. 6, 1931 |
| 1,881,376 | Hunter | Oct. 4, 1932 |
| 2,009,384 | Brett | July 30, 1935 |
| 2,406,937 | Zabriskie | Sept. 3, 1946 |
| 2,455,606 | Pleiss | Dec. 7, 1948 |